US012810782B2

(12) United States Patent
Seo et al.

(10) Patent No.: US 12,810,782 B2
(45) Date of Patent: Nov. 24, 2026

(54) DISPLAY DEVICE, ELECTRONIC DEVICE INCLUDING THE SAME, AND METHOD OF DRIVING THE SAME

(71) Applicant: Samsung Display Co., Ltd., Yongin-si (KR)

(72) Inventors: Hae Kwan Seo, Yongin-si (KR); Jin Young Roh, Yongin-si (KR); Jae Keun Lim, Yongin-si (KR); Hyoung Wook Jang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/188,831

(22) Filed: Apr. 24, 2025

(65) Prior Publication Data

US 2026/0038424 A1 Feb. 5, 2026

(30) Foreign Application Priority Data

Aug. 2, 2024 (KR) ........................ 10-2024-0102828

(51) Int. Cl.

*G09G 3/32* (2016.01)
*G06V 40/12* (2022.01)
*G06V 40/13* (2022.01)

(52) U.S. Cl.

CPC ........... *G09G 3/32* (2013.01); *G06V 40/1318* (2022.01); *G06V 40/1359* (2022.01); *G09G 2300/0852* (2013.01); *G09G 2300/0861* (2013.01); *G09G 2310/061* (2013.01); *G09G 2310/08* (2013.01); *G09G 2354/00* (2013.01); *G09G 2360/145* (2013.01)

(58) Field of Classification Search

None

See application file for complete search history.

(56) References Cited

U.S. PATENT DOCUMENTS

| | | | | |
|---|---|---|---|---|
| 10,620,354 | B2 | 4/2020 | Kong et al. | |
| 10,727,285 | B2 | 7/2020 | Chung et al. | |
| 11,075,252 | B2 | 7/2021 | Cha et al. | |
| 11,417,265 | B2 | 8/2022 | Seo et al. | |
| 11,600,231 | B2 | 3/2023 | Kim et al. | |
| 11,749,152 | B2 | 9/2023 | Seo et al. | |
| 11,783,758 | B2 | 10/2023 | Yoon et al. | |
| 2023/0326404 | A1 * | 10/2023 | Park ..................... | G09G 3/3233 |

FOREIGN PATENT DOCUMENTS

| | | | |
|---|---|---|---|
| KR | 10-2019-0097627 | A | 8/2019 |
| KR | 10-2021-0018720 | A | 2/2021 |
| KR | 10-2697930 | B1 | 8/2024 |

* cited by examiner

*Primary Examiner* — Christopher J Kohlman

(74) *Attorney, Agent, or Firm* — Womble Bond Dickinson (US) LLP

(57) ABSTRACT

A display device includes: a display panel including a sub-pixel and a light sensor configured to generate a sensing signal corresponding to an amount of received light and to provide the sensing signal to a display panel driver in response to a gate signal; and the display panel driver configured to drive the display panel, wherein the display panel driver is configured to: provide the gate signal to a display area of the display panel in a normal frame; and provide the gate signal to a sensing area in the display area, and to receive the sensing signal in a sensing frame.

20 Claims, 17 Drawing Sheets

SF

DISPLAY DEVICE, ELECTRONIC DEVICE INCLUDING THE SAME, AND METHOD OF DRIVING THE SAME

CROSS-REFERENCE TO RELATED APPLICATION

The present application claims priority to and the benefit of Korean Patent Application No. 10-2024-0102828, filed on Aug. 2, 2024, in the Korean Intellectual Property Office, the entire disclosure of which is incorporated herein by reference.

BACKGROUND

1. Field

Aspects of some embodiments of the present disclosure generally relate to a display device, an electronic device including the same, and a method of driving the same.

2. Description of the Related Art

With the development of information technologies, the importance of a display devices which provide a connection medium between users and information has increased over time. Accordingly, display devices such as liquid crystal display devices and organic light emitting display devices are increasingly used. In addition, display devices may sense fingerprints of users and perform user authentication functions, using light sensors.

The above information disclosed in this Background section is only for enhancement of understanding of the background and therefore the information discussed in this Background section does not necessarily constitute prior art.

SUMMARY

Aspects of some embodiments of the present disclosure generally relate to a display device, an electronic device including the same, and a method of driving the same, and for example, to a display device including a light sensor, an electronic device including the display device, and a method of driving the display device.

Aspects of some embodiments include a display device for relatively reducing a sensing time of a light sensor.

Aspects of some embodiments include a method of driving a display device, which drives the display device.

According to some embodiments of the present disclosure, a display device includes: a display panel including a sub-pixel and a light sensor generating a sensing signal corresponding to an amount of received light and providing the sensing signal to a display panel driver in response to a gate signal; and the display panel driver driving the display panel, wherein the display panel driver: provides the gate signal to a display area of the display panel in a normal frame; and provides the gate signal to a sensing area in the display area, thereby receiving the sensing signal in a sensing frame.

According to some embodiments, the sensing frame may include a plurality of sub-frames. According to some embodiments, the display panel driver may provide the gate signal to the sensing area in each of the sub-frames.

According to some embodiments, the sensing area may be included in pixel lines from a kth pixel line to a wth pixel line. According to some embodiments, the display panel driver may provide the gate signal to the pixel lines from the kth pixel line to the wth pixel line in the sensing frame (k is a positive integer, and w is a positive integer greater than k).

According to some embodiments, the sensing area may be included in pixel lines from a kth pixel line to a wth pixel line. According to some embodiments, the display panel driver may provide the gate signal to pixel lines from a first pixel line to the wth pixel line in the sensing frame (k is a positive integer, and w is a positive integer greater than k).

According to some embodiments, the display panel driver may perform a sensing operation on different pixel lines in each of the sub-frames.

According to some embodiments, the sensing frame may include a first sub-frame and a second sub-frame. According to some embodiments, the display panel driver may perform a sensing operation on an nth pixel line in the first sub-frame, and perform a sensing operation on an (n+1)th pixel line in the second sub-frame.

According to some embodiments, a length of a pulse of the gate signal in the sensing frame may be longer than a length of a pulse of the gate signal in the normal frame.

According to some embodiments, a length of the sensing frame may be equal to a length of the normal frame.

According to some embodiments, a length of the sensing frame may be shorter than a length of the normal frame.

According to some embodiments, when the sensing area is closer to an opposite end opposite to one end of the display panel than the one end, the display panel driver may scan pixel lines from a pixel line close to the opposite end.

According to some embodiments of the present disclosure, in a method of driving a display device including a display panel including a sub-pixel and a light sensor generating a sensing signal corresponding to an amount of received light, the method includes: providing a gate signal to a display area of the display panel in a normal frame; providing the gate signal to a sensing area in the display area in a sensing frame; and providing the sensing signal to a display panel driver driving the display panel in response to the gate signal in the sensing frame.

According to some embodiments, the sensing frame may include a plurality of sub-frames. According to some embodiments, the gate signal may be provided to the sensing area in each of the sub-frames.

According to some embodiments, the sensing area may be included in pixel lines from a kth pixel line to a wth pixel line. According to some embodiments, the gate signal may be provided to the pixel lines from the kth pixel line to the wth pixel line in the sensing frame (k is a positive integer, and w is a positive integer greater than k).

According to some embodiments, the sensing area may be included in pixel lines from a kth pixel line to a wth pixel line. According to some embodiments, the gate signal may be provided to pixel lines from a first pixel line to the wth pixel line in the sensing frame (k is a positive integer, and w is a positive integer greater than k).

According to some embodiments, a sensing operation on different pixel lines may be performed in each of the sub-frames.

According to some embodiments, the sensing frame may include a first sub-frame and a second sub-frame. According to some embodiments, a sensing operation on an nth pixel line may be performed in the first sub-frame, and a sensing operation on an (n+1)th pixel line may be performed in the second sub-frame.

According to some embodiments, a length of a pulse of the gate signal in the sensing frame may be longer than a length of a pulse of the gate signal in the normal frame.

According to some embodiments, a length of the sensing frame may be equal to a length of the normal frame.

According to some embodiments, a length of the sensing frame may be shorter than a length of the normal frame.

BRIEF DESCRIPTION OF THE DRAWINGS

Aspects of some embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
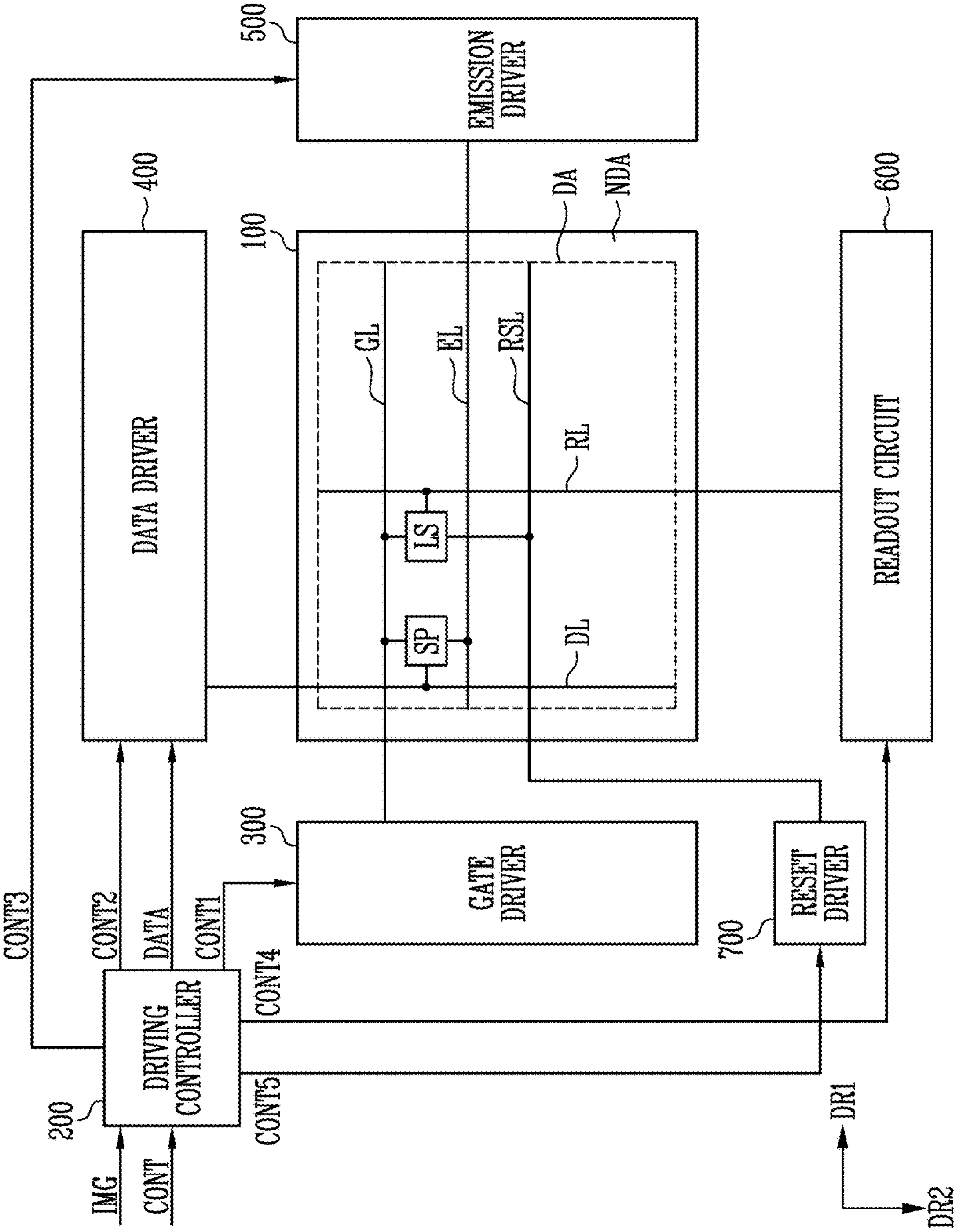
FIG. 1 is a block diagram illustrating a display device according to some embodiments of the present disclosure.

Hereinafter, aspects of some embodiments of the present disclosure will be described in more detail with reference to the accompanying drawings. In the description below, only a necessary part to understand an operation according to the present disclosure is described and the descriptions of other parts are omitted in order not to unnecessarily obscure subject matters of the present disclosure. In addition, the present disclosure is not limited to the disclosed embodiments described herein, but may be embodied in various different forms. Rather, aspects of embodiments described herein are provided to more thoroughly and more completely describe the disclosed contents and to sufficiently transfer the ideas of the disclosure to a person of ordinary skill in the art.

In the entire specification, when an element is referred to as being "connected" or "coupled" to another element, it can be directly connected or coupled to the another element or be indirectly connected or coupled to the another element with one or more intervening elements interposed therebetween. The technical terms used herein are used only for the purpose of illustrating a specific embodiment and not intended to limit the embodiments. It will be understood that when a component "includes" an element, unless there is another opposite description thereto, it should be understood that the component does not exclude another element but may further include another element. It will be understood that for the purposes of this disclosure, "at least one of X, Y, and Z" can be construed as X only, Y only, Z only, or any combination of two or more items X, Y, and Z (e.g., XYZ, XYY, YZ, ZZ). Similarly, for the purposes of this disclosure, "at least one selected from the group consisting of X, Y, and Z" can be construed as X only, Y only, Z only, or any combination of two or more items X, Y, and Z (e.g., XYZ, XYY, YZ, ZZ).

It will be understood that, although the terms "first", "second," etc. may be used herein to describe various elements, these elements should not be limited by these terms. These terms are only used to distinguish one element from another element. Thus, a "first" element discussed below could also be termed a "second" element without departing from the teachings of the present disclosure.

Spatially relative terms, such as "below," "above," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the term, "above," may encompass both an orientation of above and below. The apparatus may be otherwise oriented (e.g., rotated 90 degrees or at other orientations) and the spatially relative descriptors used herein interpreted accordingly.

In addition, the embodiments of the disclosure are described here with reference to schematic diagrams of ideal embodiments (and an intermediate structure) of the present disclosure, so that changes in a shape as shown due to, for example, manufacturing technology and/or a tolerance may be expected. Therefore, the embodiments of the present disclosure shall not be limited to the specific shapes of a region shown here, but include shape deviations caused by, for example, the manufacturing technology. The regions shown in the drawings are schematic in nature, and the shapes thereof do not represent the actual shapes of the regions of the device, and do not limit the scope of the disclosure.

Hereinafter, aspects of some embodiments of the present disclosure will be described in more detail with reference to the accompanying drawings.

FIG. 1 is a block diagram illustrating a display device according to some embodiments of the present disclosure.

Referring to FIG. 1, the display device may include a display panel 100 and a display panel driver. The display panel driver may include a driving controller 200, a gate driver 300, a data driver 400, an emission driver 500, a readout circuit 600, and a reset driver 700. According to some embodiments, at least two of the driving controller 200, the data driver 400, and the readout circuit 600 may be integrated into one chip.

The display panel 100 may include a display area DA at which images are displayed and a non-display area NDA located adjacent to (e.g., in a periphery or outside a footprint of) the display area DA. According to some embodiments, the gate driver 300 and the emission driver 500 may be mounted in the non-display area NDA.

The display panel 100 may include a plurality of gate lines GL, a plurality of data lines DL, a plurality of emission lines EL, and a plurality of sub-pixels SP electrically connected to the gate lines GL, the data lines DL, and the emission lines EL. The gate lines GL and the emission lines EL may extend in a first direction DR1, and the data lines DL may extend in a second direction DR2 intersecting the first direction DR1.

The display panel 100 may include a plurality of gate lines GL, reset lines RSL, a plurality of readout lines RL, and a plurality of light sensors LS electrically connected to the gate lines GL, the reset lines RSL, and the readout lines RL.

In these embodiments, it is illustrated that the reset lines RSL are connected to the reset driver 700. However, embodiments according to the present disclosure are not limited thereto. For example, the reset lines RSL may be driven by the gate driver 300 or the emission driver 500 instead of the reset driver 700.

The driving controller 200 may receive input image data IMG and an input control signal CONT from a processor (e.g., a graphic processing unit (GPU) or the like). For example, the input image data IMG may include red image data, green image data, and blue image data. According to some embodiments, the input image data IMG may further include white image data. In another example, the input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, a fourth control signal CONT4, a fifth control signal CONT5, and a data signal DATA, based on the input image data IMG and the input control signal CONT.

The driving controller 200 may generate the first control signal CONT1 for controlling an operation of the gate driver 300, based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 400, based on the input control signal CONT, and output the second control signal CONT2 to the data driver 400. The second control signal CONT2 may include a horizontal start signal and a load signal.

The driving controller 200 may generate the data signal DATA by receiving the input image data IMG and the input control signal CONT. The driving controller 200 may output the data signal DATA to the data driver 400.

The driving controller 200 may generate the third control signal CONT3 for controlling an operation of the emission driver 500, based on the input control signal CONT, and output the third control signal CONT3 to the emission driver 500. The third control signal CONT3 may include a vertical start signal and an emission clock signal.

The driving controller 200 may generate the fourth control signal CONT4 for controlling an operation of the readout circuit 600, based on the input control signal CONT, and output the fourth control signal CONT to the readout circuit 600.

The driving controller 200 may generate the fifth control signal CONT5 for controlling an operation of the reset driver 700, based on the input control signal CONT, and output the fifth control signal CONT5 to the reset driver 700.

The gate driver 300 may generate gate signals for driving the gate lines GL connected to the plurality of sub-pixels SP and the gate lines GL connected to the plurality of light sensors LS in response to the first control signal CONT1 input from the driving controller 200. The gate driver 300 may output the gate signals to the gate lines GL connected to the plurality of sub-pixels SP and the gate lines GL connected to the plurality of light sensors LS. For example, the gate driver 300 may sequentially output the gate signals to the gate lines GL connected to the plurality of sub-pixels SP and the gate lines GL connected to the plurality of light sensors LS. Although FIG. 1 illustrates a single sub-pixel SP, a single light sensor LS, a single gate line GL, a single emission line EL, and a single reset line RSL, as a person having ordinary skill in the art would appreciate, the number of sub-pixels SP, light sensors LS, gate lines GL, emission lines EL, and reset lines RSL may vary according to the design and size of the display panel 100.

The data driver 400 may receive the second control signal CONT and the data signal DATA, which are input from the driving controller 200. The data driver 400 may generate data voltages obtained by converting the data signal DATA into a voltage in an analog form. The data driver 400 may output the data voltages to the data lines DL.

The emission driver 500 may generate emission signals for driving the emission lines EL in response to the third control signal CONT3 input from the driving controller 200. The emission driver 500 may output the emission signals to the emission lines EL. For example, the emission driver 500 may sequentially output the emission signals to the emission lines EL.

The readout circuit 600 may generate sensing information based on sensing signals received from the readout lines RL in response to the fourth control signal CONT4 input from the driving controller 200. For example, the readout circuit 600 may generate the sensing information by analog-to-digital converting the sensing signals. For example, the sensing information may correspond to a fingerprint image. The processor or the driving controller 200 may perform a user authentication function, using the sensing information provided from the readout circuit 600.

The reset driver 700 may provide a reset signal RST (see FIG. 2) to the reset lines RSL in response to the fifth control signal CONT5 input from the driving controller 200. According to some embodiments, the reset driver 700 may commonly connected to all the light sensors LS through a reset line RSL. According to some embodiments, the reset driver 700 may be connected to the light sensors LS respectively through a plurality of reset lines RSL.

Each sub-pixel SP may include a light emitting element. The light emitting element may be a light emitting diode. The light emitting element may be configured as an organic light emitting diode, an inorganic light emitting diode, a quantum dot/well light emitting diode, or the like. The light emitting element may emit light of any one color among a first color, a second color, and a third color.

Each light sensor LS may include a light receiving element. According to some embodiments, the light emitting element may be a photo diode. According to some embodiments, the light receiving element may be configured as a photo transistor.

According to some embodiments, the light sensors LS may be arranged in the entire area of the display area DA. According to some embodiments, the light sensors may be located in a sensing area FSA (see FIG. 4) in which sensing is performed in the display area DA or a partial area including the sensing area FSA (see FIG. 4).

Light emitted from a light emitting element may be reflected by a fingerprint of a user to be applied to a light receiving element adjacent to the light emitting element. In addition, the light sensor LS may generate a sensing signal corresponding to an amount of the light applied to the light receiving element. The processor or the driving controller 200 may distinguish a valley and a ridge of the fingerprint from each other according to an intensity of the sensing signal, and accordingly obtain a fingerprint image of the user.

Figure 2:
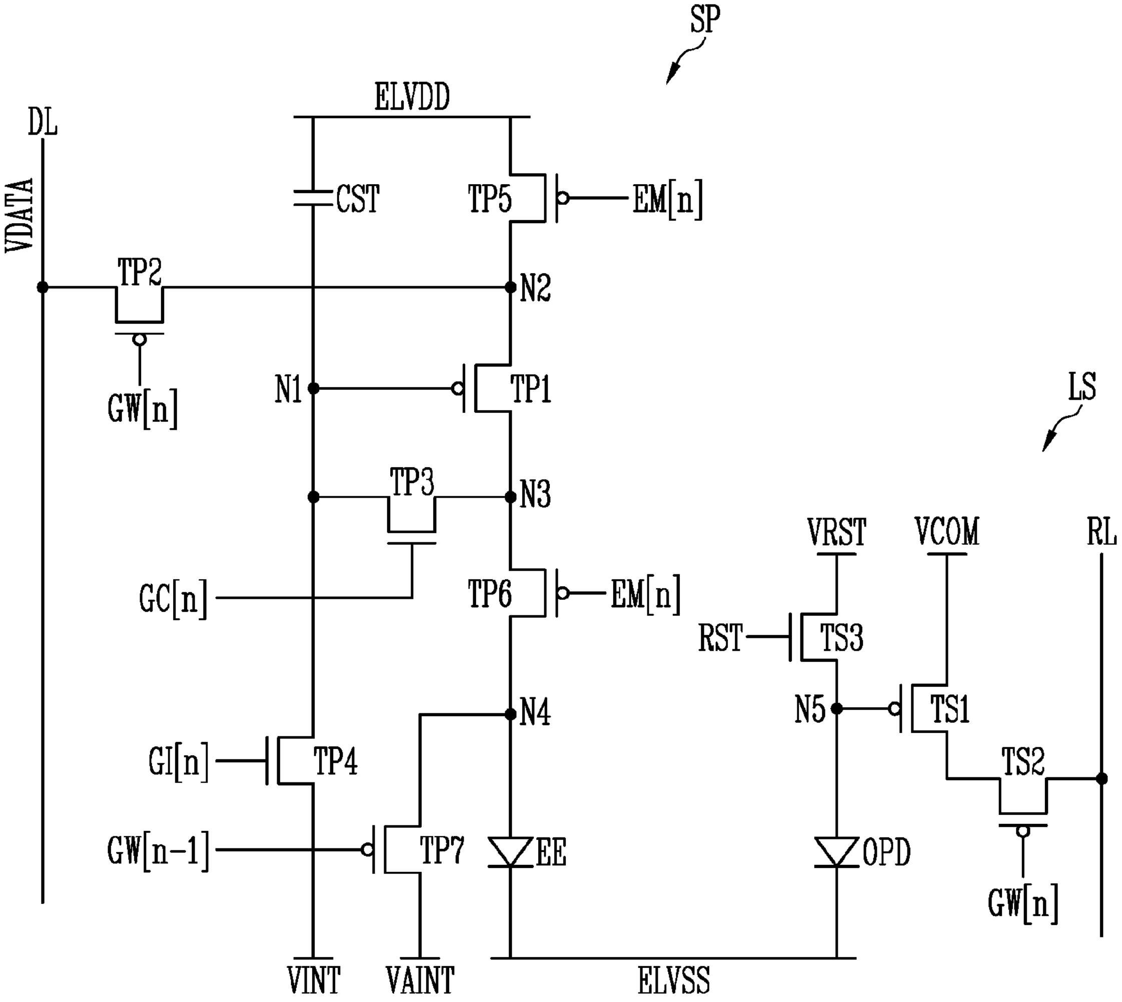
FIG. 2 is a circuit diagram illustrating an example of a sub-pixel and a light sensor of the display device shown in FIG. 1.

FIG. 2 is a circuit diagram illustrating an example of the sub-pixel and the light sensor of the display device shown in FIG. 1. Although FIG. 2 illustrates various components in a sub-pixel and a light sensor according to some embodiments, embodiments according to the present disclosure are not limited thereto, and according to some embodiments, the sub-pixel and light sensor may include additional components or fewer components without departing from the spirit and scope of embodiments according to the present disclosure.

FIG. 2 illustrates a sub-pixel SP and a light sensor LS of an nth pixel line. A pixel line is determined with respect to a gate line GL, and a sub-pixel SP and a light sensor LS, which are connected to the same pixel line, are connected to the same gate line GL. Here, n is a positive integer.

Referring to FIG. 2, the sub-pixel SP may include a first pixel transistor TP1 generating a driving current corresponding to a data voltage VDATA and a light emitting element EE emitting light by receiving the driving current.

For example, the sub-pixel SP may include the first pixel transistor TP1 (i.e., a driving transistor) including a control electrode connected to a first node N1, a first electrode connected to a second node N2, and a second electrode connected to a third node N3, a second pixel transistor TP2 including a control electrode receiving a write gate signal GW[n], a first electrode connected to a data line DL, and a second electrode connected to the second node N2, a third pixel transistor TP3 including a control electrode receiving a compensation gate signal GC[n], a first electrode connected to the third node N3, and a second electrode connected to the first node N1, a fourth pixel transistor TP4 including a control electrode receiving an initialization gate signal GI[n], a first electrode receiving a first initialization voltage VINT, and a second electrode connected to the first node N1, a fifth pixel transistor TP5 including a control electrode receiving an emission signal EM[n], a first electrode receiving a first power voltage ELVDD (e.g., a high power voltage), and a second electrode connected to the second node N2, a sixth pixel transistor TP6 including the emission signal EM[n], a first electrode connected to the third node N3, and a second electrode connected to a fourth node N4, a seventh pixel transistor TP7 including a control electrode receiving a previous write gate signal GW[n−1], a first electrode receiving a second initialization voltage VAINT, and a second electrode connected to the fourth node N4, a storage capacitor CST including a first electrode receiving the first power voltage ELVDD and a second electrode connected to the first node N1, and the light emitting element EE including a first electrode (i.e., an anode electrode) connected to the fourth node N4 and a second electrode (i.e., a cathode electrode) receiving a second power voltage ELVSS (e.g., a low power voltage). However, the present disclosure is not limited to the structure of the sub-pixel SP.

The previous write gate signal GW[n−1] applied to the sub-pixel SP of the nth pixel line means a signal applied to a control electrode of a second pixel transistor TP2 of an (n−1)th pixel line. However, embodiments according to the present disclosure are not limited thereto, and a signal separate from the write gate signal GW[n] instead of the previous write gate signal GW[n−1] may be used.

The first, second, fifth, sixth, and seventh pixel transistors TP1, TP2, TP5, TP6, and TP7 may be implemented with a p-channel metal oxide semiconductor (P MOS) transistor, and the third and fourth pixel transistors TP3 and TP4 may be implemented with an n-channel metal oxide semiconductor (NMOS) transistor. In the case of the PMOS transistor, a low voltage level may be an activation level, and a high voltage level may be a non-activation level. For example, when a signal applied to a control electrode of the PMOS transistor has the low voltage level, the PMOS transistor may be turned on. For example, when the signal applied to the control electrode of the PMOS transistor has the high voltage level, the P MOS transistor may be turned off. In the case of the NMOS transistor, a low voltage level may be a non-activation level, and a high voltage level may be an activation level. For example, when a signal applied to a control electrode of the NMOS transistor has the low voltage level, the NMOS transistor may be turned off. For example, when the signal applied to the control electrode of the NMOS transistor has the high voltage level, the NMOS transistor may be turned on. That is, the activation level and the non-activation level may be determined according to the kind of transistor. However, the pixel transistors according to embodiments of the present disclosure are not limited to any one of NMOS and PMOS.

Hereinafter, providing the gate signals GI[n], GC[n], and GW[n], and/or the emission signal EM[n] means providing a signal having an activation level.

The light sensor LS may generate a sensing signal corresponding to an amount of received light. The light sensor LS may include a first sensing transistor TS1 generating a sensing signal corresponding to an amount of received light, a second sensing transistor TS2 providing the sensing signal to a readout line RL in response to the write gate signal GW[n], and a light receiving element OP D connected to a control node of the first sensing transistor TS1. The light sensor LS may include a third sensing transistor TS3 initializing the control node of the first sensing transistor TS1 in response to a reset signal RST.

For example, the first sensing transistor TS1 may include the control electrode connected to a fifth node N5, a first electrode receiving a common voltage VCOM, and a second electrode connected to a first electrode of the second sensing transistor TS2, the second sensing transistor TS2 may include a control electrode receiving the write gate signal GW[n], the first electrode connected to the second electrode of the first sensing transistor TS1, and a second electrode connected to the readout line RL, and the light receiving element OPD may include a first electrode connected to the fifth node N5 and a second electrode receiving the second power voltage ELVSS. The third sensing transistor TS3 may include a control electrode receiving the reset signal RST, a first electrode receiving a reset voltage VRST, and a second electrode connected to the fifth node N5.

For example, in a reset period, the reset signal may have an activation level, and the write gate signal GW[n] may have a non-activation level. Accordingly, the third sensing transistor TS3 may be turned on, and the second sensing transistor TS2 may be turned off. In addition, the reset voltage VRST may be applied to the fifth node N5. That is, the fifth node N5 and the first electrode of the light receiving element OPD may be initialized.

For example, in a light receiving period, the reset signal RST and the write gate signal GW[n] may have a non-activation level. Accordingly, the second sensing transistor TS2 and the third sensing transistor TS3 may be turned off. In addition, when light is applied, the light receiving element OP D may generate a current in a direction facing the fifth node N5, and a voltage of the fifth node N5 may be decreased. Accordingly, the intensity of a sensing signal generated in a sensing-on period which will be described later may vary. In addition, because the amount of light applied to the light receiving element OP D varies according to a valley and a ridge of a fingerprint, the intensity of the sensing signal may vary according to the valley and the ridge of the fingerprint.

For example, in the sensing-on period (i.e., a writing period WP (see FIG. 6) which will be described later), the reset signal RST may have a non-activation level, and the write gate signal GW[n] may have an activation level. Accordingly, the second sensing transistor TS2 may be turned on, and the third sensing transistor TS3 may be turned off. In addition, the first sensing transistor TS1 may generate a sensing signal corresponding to a gate-source voltage. The sensing signal may be applied to the readout circuit through the readout line RL.

The first and second sensing transistors TS1 and TS2 may be implemented with a PMOS transistor, and the third sensing transistor TS3 may be implemented with an NMOS transistor. However, the sensing transistors according to embodiments of the present disclosure are not limited to any one of NMOS and PMOS.

Figure 3:
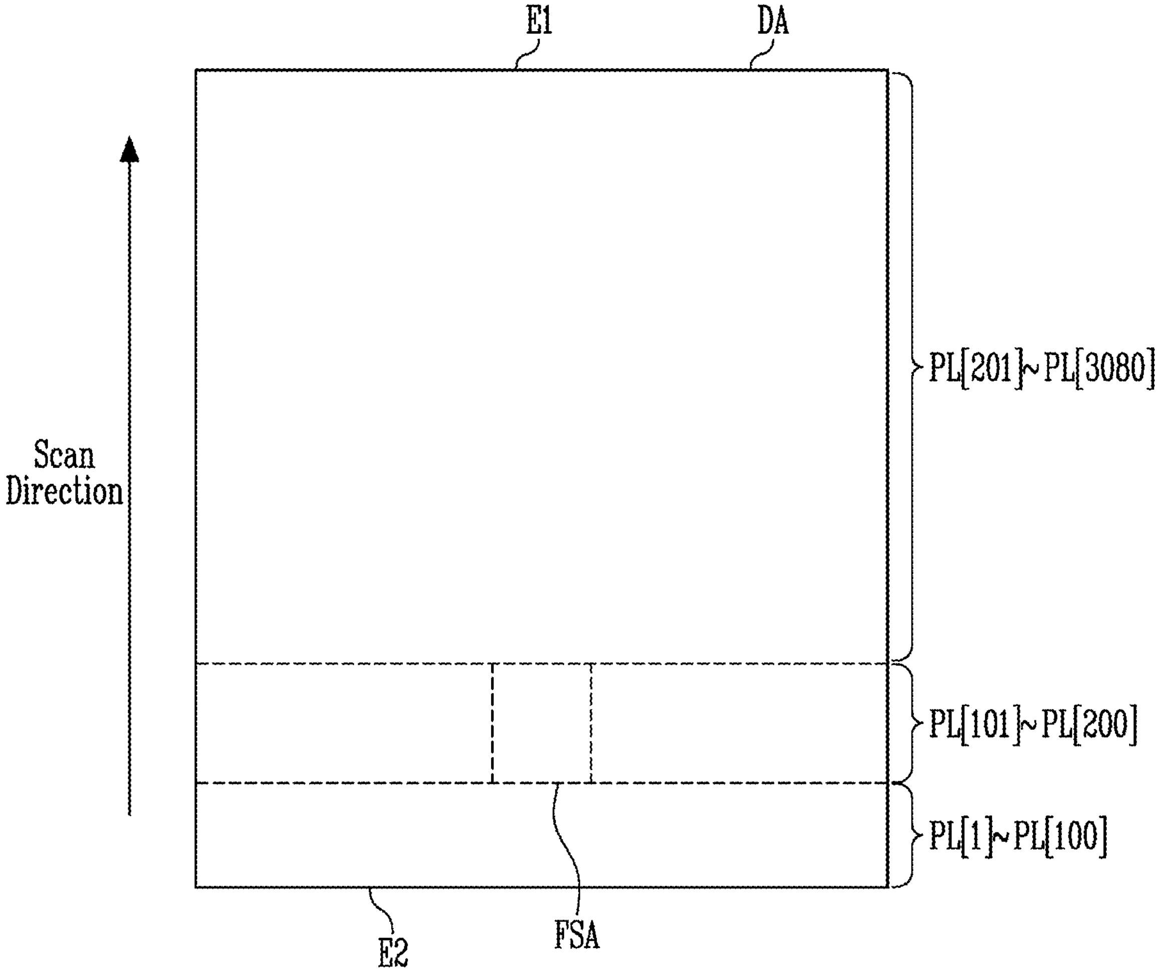
FIG. 3 is a diagram illustrating an example of a display area of the display device shown in FIG. 1.

FIG. 3 is a diagram illustrating an example of the display area of the display device shown in FIG. 1.

For convenience of description, FIG. 3 illustrates that a sensing area FSA is included in pixel lines from a 101th first pixel line PL[101] to a 200th pixel line PL[200].

Referring to FIGS. 1 to 3, when the sensing area FSA is closer to an opposite end E2 opposite to one end E1 of the display area DA than the one end E1, the display panel driver may scan pixel lines from a pixel line close to the opposite end E2. For example, the display panel driver may sequentially scan pixel lines from a first pixel line PL[1] to a 3080th pixel line PL[3080]. For example, the display panel driver may sequentially provide the gate signals GI[n], GC[n], and GW[n] to the pixel lines from the first pixel line PL[1] to the 3080th pixel line PL[3080].

Figure 6:
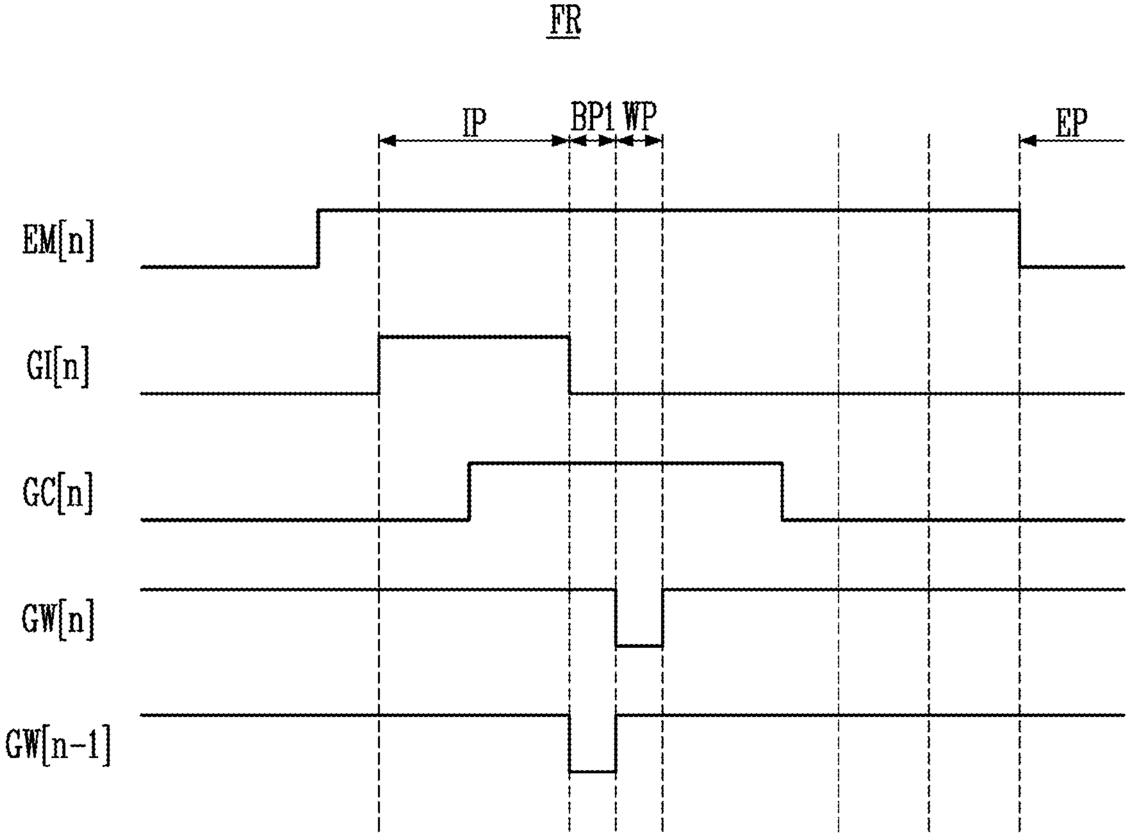
FIG. 6 is a timing diagram illustrating an example in which the display device shown in FIG. 1 drives the sub-pixel and the light sensor.
Figure 8:
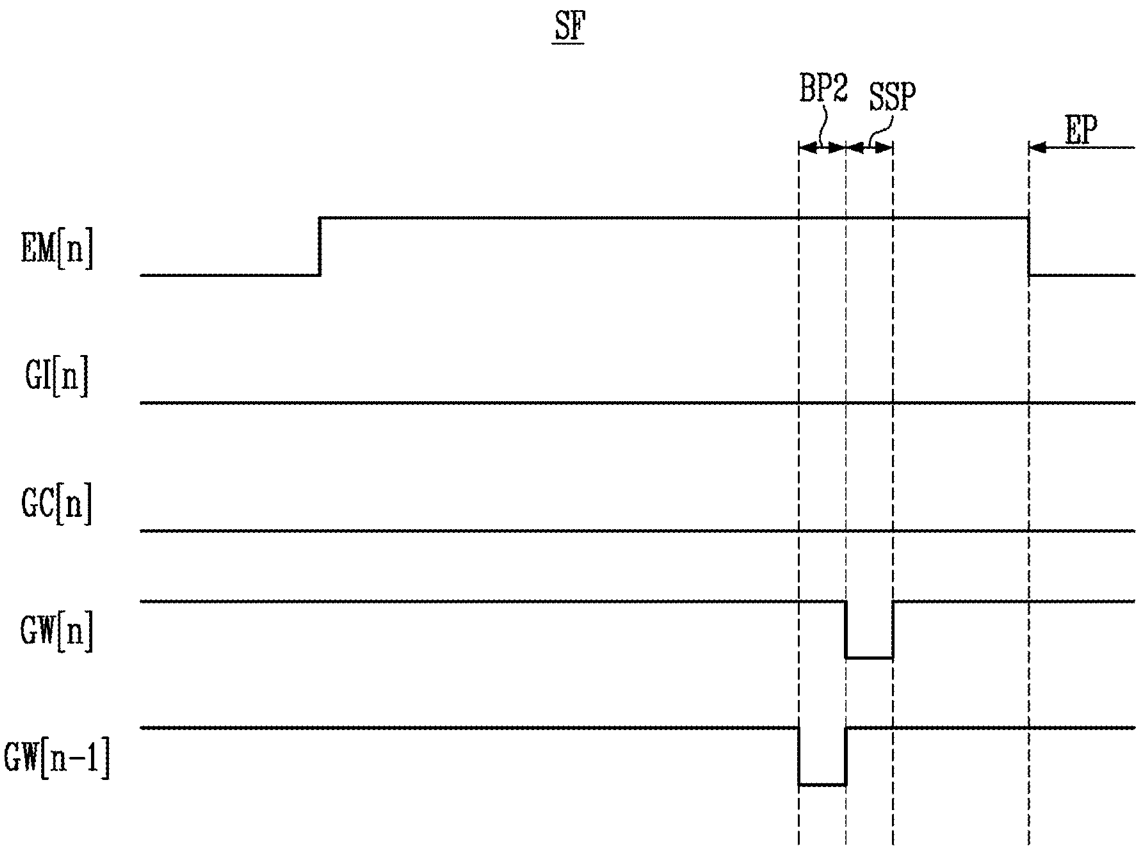
FIG. 8 is a timing diagram illustrating that a display device drives the sub-pixel and the light sensor in a sensing frame according to some embodiments of the present disclosure.

That the display panel driver scans the pixel lines means that the display panel driver performs operations of an initialization period IP, a first bias period BP1, and a writing period WP, which are shown in FIG. 6. However, in the case of a display panel driver of a display device according to some embodiments of the present disclosure, which is shown in FIG. 8, that the display panel driver scans pixel lines in a sensing frame means that the display panel driver performs operations of a second bias period BP2 and a sensing period SSP, which are shown in FIG. 8.

Figure 4:
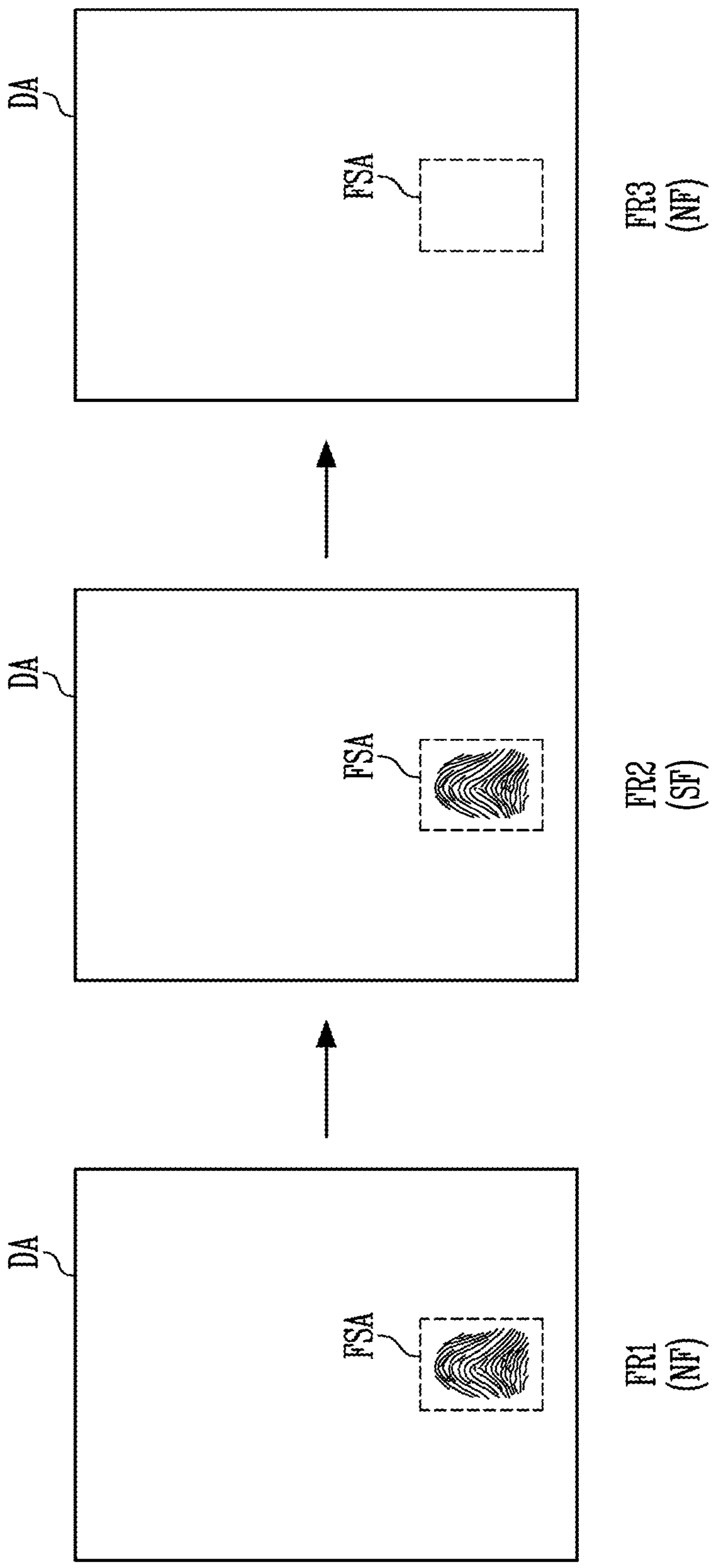
FIG. 4 is a conceptual diagram illustrating an example in which the display device shown in FIG. 1 performs a sensing operation.

FIG. 4 is a conceptual diagram illustrating an example in which the display device shown in FIG. 1 performs a sensing operation. FIG. 4 illustrates that the sensing operation is performed in a second frame FR2.

Referring to FIG. 4, a sensing area FSA may be displayed in the display area DA before the sensing operation is performed. For example, in the case of a sensing operation for sensing a fingerprint, a shape of a fingerprint may be displayed in the sensing area FSA. For example, the shape of the fingerprint may be displayed in the sensing area FSA of at least one frame (e.g., a first frame FR1) just before a frame (i.e., the second frame FR2) in which the sensing operation is performed (hereinafter, referred to as a sensing frame SF).

When the sensing operation is performed, the display panel driver may generate sensing information based on sensing signals received from the readout lines RL (see FIG. 2). The sensing operation means an operation performed until the sensing signals are received and the sensing information is generated.

The sensing area FSA may not be displayed in the display area DA in a frame (e.g., a third frame FR3) after the sensing frame SF. For example, in the case of the sensing operation for sensing the fingerprint, the shape of the fingerprint may disappear.

Figure 5:
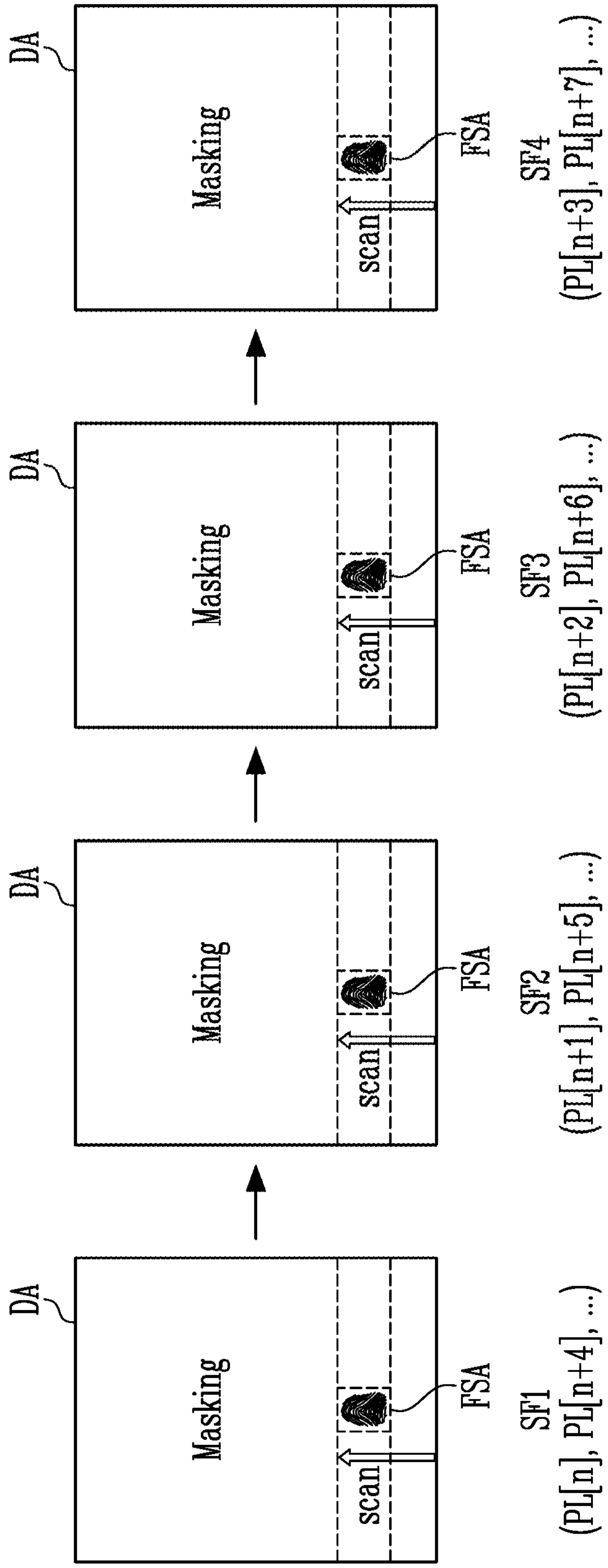
FIG. 5 is a conceptual diagram illustrating an example of the sensing operation of the display device shown in FIG. 1.

FIG. 5 is a conceptual diagram illustrating an example of the sensing operation of the display device shown in FIG. 1.

Referring to FIGS. 3 to 5, in a frame (e.g., the first frame FR1 and the third frame FR3) (hereinafter, referred to as a normal frame NF) in which the sensing operation is not performed, all pixel lines (e.g., the first to 3080th pixel lines PL[1] to PL[3080]) may be scanned for the purpose of writing of the data voltage VDATA (see FIG. 2). For example, the gate signals GI[n], GC[n], and GW[n] may be provided to all the pixel lines (e.g., the first to 3080th pixel lines PL[1] to PL[3080]) in the normal frame NF.

In the sensing frame SF, pixel lines (e.g., the 101th to 200th pixel lines PL[101] to PL[200]) of the sensing area FSA may be scanned for the purpose of the sensing operation. For example, in the sensing frame SF, the gate signals GI[n], GC[n], and GW[n] may be provided to the pixel lines (e.g., the 101th to 200th pixel lines PL[101] to PL[200]) of the sensing area FSA.

According to some embodiments, the display panel driver may scan pixel lines from the first pixel line PL[1] to the 200th pixel line PL[200]. For example, the display panel driver may provide the gate signals GI[n], GC[n], and GW[n] to the pixel lines from the first pixel line PL[1] to the 200th pixel line PL[200]. The other pixel lines (e.g., the 201th to 3080 pixel lines PL[201] to PL[3080]) may be masked. For example, the display panel driver may control the gate driver 300 (see FIG. 1) such that the gate driver 300 (see FIG. 1) does not provide the gate signals GI[n], GC[n], and GW[n] to the masked pixel lines.

According to some embodiments, the display panel driver may scan pixel lines from the 101th pixel line PL[101] to the 200th pixel line PL[200]. For example, in the sensing frame SF, the display panel driver may provide the gate signals GI[n], GC[n], and GW[n] to the pixel lines from the 101th pixel line PL[101] to the 200th pixel line PL[200]. The other pixel lines (e.g., the first to 100th pixel lines PL[1] to PL[100] and the 201th to 3080th pixel lines PL[201] to PL[3080]) may be masked.

The sensing frame SF may include a plurality of sub-frames. For example, the sensing frame SF may include first to fourth sub-frames SF1 to SF4. The display panel driver may provide the gate signals GI[n], GC[n], and GW[n] to the sensing area FSA in each of the sub-frames. The display panel driver may perform the sensing operation on different pixel lines in the sub-frames.

For example, the display panel driver may perform the sensing operation on an nth pixel line PL[n], an (n+4)th pixel line PL[n+4], . . . in the first sub-frame SF1. For example, the display panel driver may perform the sensing operation on an (n+1)th pixel line PL[n+1], an (n+5)th pixel line PL[n+5], . . . in the second sub-frame SF2. For example, the display panel driver may perform the sensing operation on an (n+2)th pixel line PL[n+2], an (n+6)th pixel line PL[n+6], . . . in the third sub-frame SF3. For example, the display panel driver may perform the sensing operation on an (n+3)th pixel line PL[n+3], an (n+7)th pixel line PL[n+7], . . . in the fourth sub-frame SF4.

According to some embodiments, in the sensing frame SF, scanned pixel lines (e.g., the first to 200th pixel lines PL[1] to PL[200]) and pixel lines (e.g., the nth pixel line PL[1], the (n+4)th pixel line PL[n+4], . . . in the first sub-frame SF1) on which the sensing operation is performed do not accord with each other, but the present disclosure is not limited thereto. For example, only the nth pixel line PL[1], the (n+4)th pixel line PL[n+4], . . . may be scanned in the first sub-frame SF1.

For convenience of description, it is assumed that a time of 4 μs is required for the readout circuit 600 (see FIG. 1) to convert a sensing signal into sensing information, and the display panel driver scans pixel lines in a cycle of 1 μs. After the sensing operation on the nth pixel line PL[n] is performed (i.e., after the time of 4 μs elapses), the sensing operation on the (n+4)th pixel line PL[n+4] may be performed. That is, four frames may be required to perform the sensing operation on the entire sensing area FSA. However, the display device according to some embodiments of the present disclosure performs only scanning on the sensing area FSA instead of scanning on the entire display area DA during the sensing frame SF, so that four sub-frames are included in one sensing frame SF. Accordingly, a sensing operation performed throughout the existing four frames can be performed in one frame. That is, a sensing time can be relatively reduced.

In these embodiments, it is illustrated that one sensing frame SF includes four sub-frames. However, embodiments according to the present disclosure are not limited thereto. For example, when one sensing frame SF includes two sub-frames, the sensing operation may be performed through two frames. The sensing time can also be relatively reduced.

That the display panel driver scans pixel lines in the cycle of 1 μs may mean that the gate signals GI[n], GC[n], and GW[n] and the emission signal EM[n] are provided to the nth pixel line PL[n], and the gate signals GI[n], GC[n], and GW[n] are provided to the (n+1)th pixel line PL[n+1] after a time of 1 μs elapses.

FIG. 6 is a timing diagram illustrating an example in which the display device shown in FIG. 1 drives the sub-pixel and the light sensor.

Referring to FIGS. 2 and 6, one frame FR may include an initialization period IP, a first bias period BP1, a writing period WP, and an emission period EP.

In the initialization period IP, the initialization gate signal GI[n] may have an activation level, and the fourth pixel transistor TP4 may be turned on. Accordingly, the first initialization voltage VINT may be applied to the first node N. That is, the control electrode of the first pixel transistor TP1 (i.e., the storage capacitor CST) may be initialized.

In the first bias period BP1, the previous write gate signal GW[n−1] may have an activation level, and the seventh pixel transistor TP7 may be turned on. Accordingly, the second initialization voltage VATIN may be applied to the first electrode (i.e., the anode electrode) of the light emitting element EE.

In the writing period WP, the write gate signal GW[n] and the compensation gate signal GC[n] may have an activation level, and the second pixel transistor TP2, the third pixel transistor TP3, and the second sensing transistor TS2 may be turned on. Accordingly, a data voltage VDATA may be written in the storage capacitor CST, and a sensing signal may be transferred to the readout line RL. The readout circuit 600 (see FIG. 1) may generate sensing information, based on the received sensing signal.

In the emission period EP, the emission signal EM[n] may have an activation level, and the fifth pixel transistor TP5 and the sixth pixel transistor TP6 may be turned on. Accordingly, the first power voltage ELVDD may be applied to the first pixel transistor TP1 such that a driving current is generated, and the driving current may be applied to the light emitting element EE. That is, the light emitting element EE may emit light with a luminance corresponding to the driving current.

Figure 7:
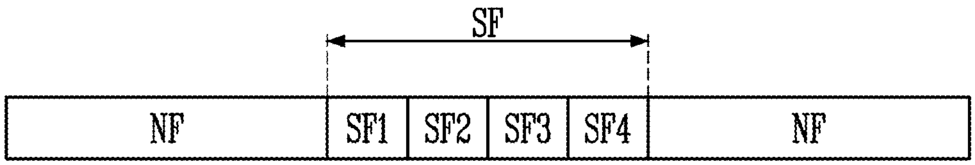
FIG. 7 is a conceptual diagram illustrating an example of a normal frame and a sensing frame according to the display device shown in FIG. 1.

FIG. 7 is a conceptual diagram illustrating an example of a normal frame and a sensing frame according to the display device shown in FIG. 1.

Referring to FIG. 7, a length of the sensing frame SF may be equal to a length of the normal frame NF. In each sub-frame, the display panel driver may not scan any pixel lines until a next sub-frame or a next frame starts after scanning of the sensing area FSA (see FIG. 3) is terminated.

FIG. 8 is a timing diagram illustrating that a display device drives the sub-pixel and the light sensor in a sensing frame according to some embodiments of the present disclosure.

The display device according to some embodiments is configured substantially identical to the display device shown in FIG. 1, except an operation of a sensing frame SF. Therefore, identical or similar components are designated by like reference numerals, and overlapping descriptions will be omitted.

Referring to FIGS. 2 and 8, the display panel driver may not write the data voltage VDATA in a sensing frame SF. For example, the display panel driver may perform only the sensing operation without writing the data voltage VDATA in the sensing frame SF.

The sensing frame SF may include a second bias period BP2 and a sensing period SSP. In the sensing frame SF, the initialization gate signal GI[n] and the compensation gate signal GC[n] may have a non-activation level. Accordingly, the sensing frame SF may not include the initialization period IP and the writing period WP.

In the second bias period BP2, the previous write gate signal GW[n−1] may have an activation level, and the seventh pixel transistor TP7 may be turned on. Accordingly, the second initialization voltage VATIN may be applied to the first electrode (i.e., the anode electrode) of the light emitting element EE.

In the sensing period SSP, the write gate signal GW[n] may have an activation level, the second sensing transistor TS2 may be turned on. Accordingly, a sensing signal may be transferred to the readout line RL. The readout circuit 600 (see FIG. 1) may generate sensing information, based on the received sensing signal.

In the emission period EP, the emission signal EM[n] ma have an activation level, the fifth pixel transistor TP5 and the sixth pixel transistor TP6 may be turned on. Accordingly, the first power voltage ELVDD may be applied to the first pixel transistor TP1 such that a driving current is generated, and the driving current may be applied to the light emitting element EE. That is, the light emitting element EE may emit light with a luminance corresponding to the driving current. In addition, since the data voltage VDATA is not written in the sensing frame SF, the light emitting element EE may emit light with a luminance corresponding to a data voltage VDATA written in a previous frame.

Figure 9:
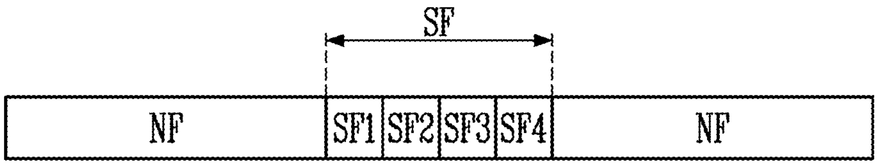
FIG. 9 is a conceptual diagram illustrating a normal frame and a sensing frame according to a display device according to some embodiments of the present disclosure.

FIG. 9 is a conceptual diagram illustrating a normal frame and a sensing frame according to a display device according to some embodiments of the present disclosure.

The display device according to some embodiments is configured substantially identical to the display device shown in FIG. 1, except a length of a sensing frame SF. Therefore, identical or similar components are designated by like reference numerals, and overlapping descriptions will be omitted.

Referring to FIG. 9, a length of a sensing frame SF may be shorter than a length of a normal frame NF. When scanning of the sensing area FSA (see FIG. 3) is terminated in each sub-frame, the corresponding sub-frame may be terminated. In addition, when scanning is terminated in all sub-frames, the sensing frame SF may be terminated. For example, the processor may be set to output a vertical synchronization signal in a short cycle with respect to the sensing frame SF. Since the length of the sensing frame becomes short, the sensing time can be further reduced.

Figure 10:
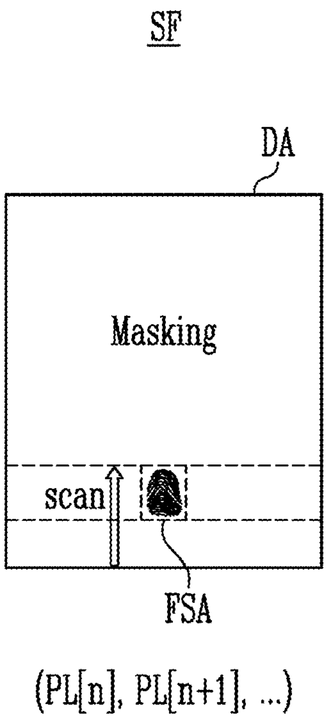
FIG. 10 is a conceptual diagram illustrating an example of a sensing operation of a display device according to some embodiments of the present disclosure.
Figure 11:
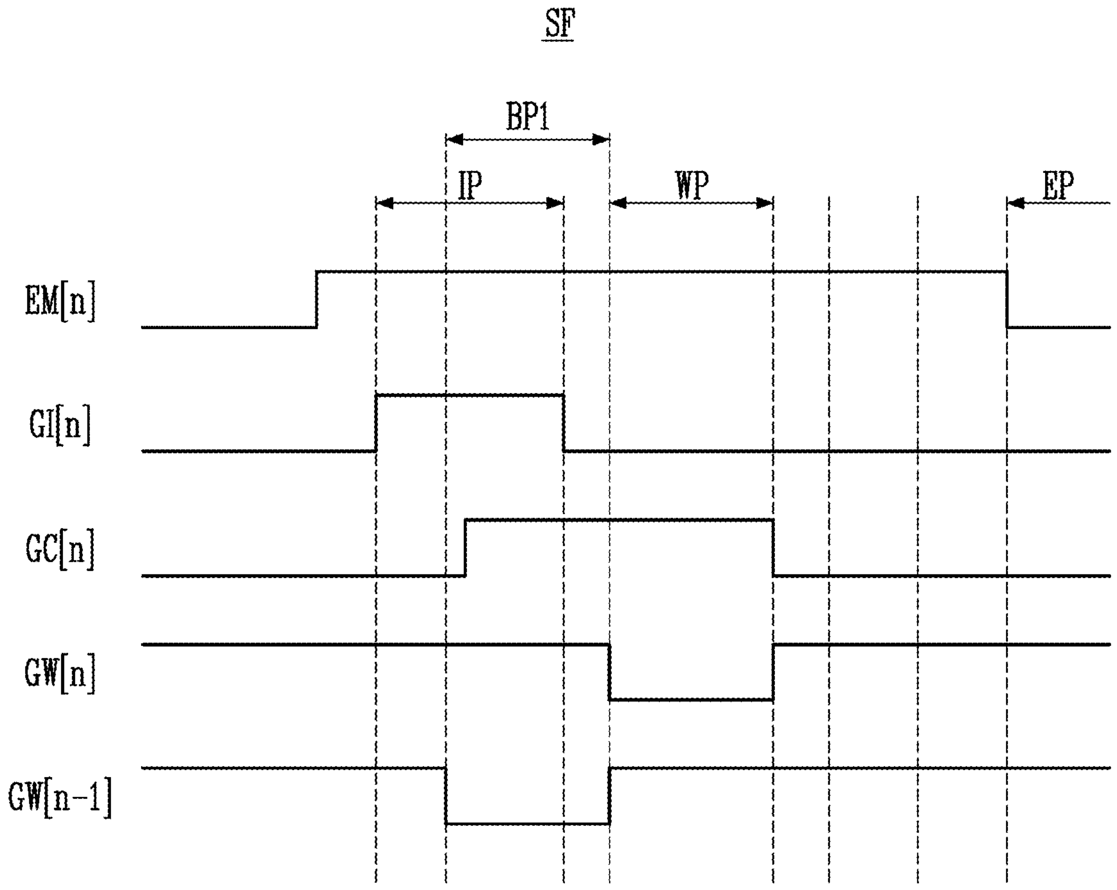
FIG. 11 is a timing diagram illustrating an example in which the display device shown in FIG. 10 drives the sub-pixel and the light sensor in a sensing frame.

FIG. 10 is a conceptual diagram illustrating an example of a sensing operation of a display device according to some embodiments of the present disclosure. FIG. 11 is a timing diagram illustrating an example in which the display device shown in FIG. 10 drives the sub-pixel and the light sensor in a sensing frame.

The display device according to some embodiments is configured substantially identical to the display device shown in FIG. 1, except an operation of a sensing frame SF. Therefore, identical or similar components are designated by like reference numerals, and overlapping descriptions will be omitted.

Referring to FIG. 10, a length of a pulse of the write gate signal GW[n] in a sensing frame SF may be longer than a length of a pulse of the write gate signal GW[n] in a normal frame NF. Since the display panel driver performs scanning on an area up to the sensing area FSA instead of scanning on the entire display area DA during the sensing frame SF, a write gate signal GW[n] having a longer pulse may be used. For example, the pulse of the write gate signal GW[n] may be lengthened by a time for securing a time for which the readout circuit 600 (see FIG. 1) converts a sensing signal into sensing information. Accordingly, although a plurality of sub-frames are not included in one sensing frame SF, the sensing operation can be performed in one frame.

Figure 12:
FIG. 12 is a conceptual diagram illustrating an example of a normal frame and a sensing frame according to the display device shown in FIG. 10.

FIG. 12 is a conceptual diagram illustrating an example of a normal frame and a sensing frame according to the display device shown in FIG. 10.

Referring to FIG. 12, a length of the sensing frame SF may be shorter than a length of the normal frame NF. When scanning of the sensing area FSA (see FIG. 3) in the sensing frame SF is terminated, the sensing frame SF may be terminated. For example, the processor may be set to output a vertical synchronization signal in a short cycle with respect to the sensing frame SF. Since the length of the sensing frame SF is shortened, the sensing time can be further reduced.

Figure 13:
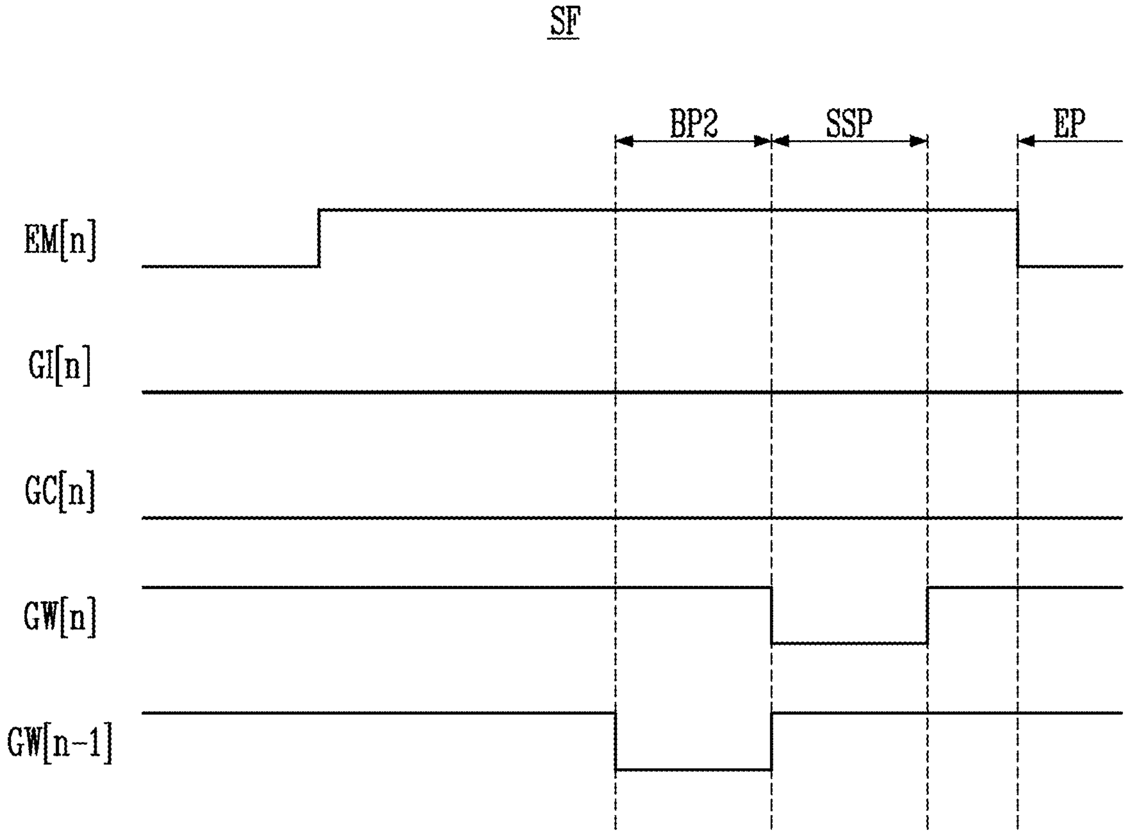
FIG. 13 is a timing diagram illustrating that a display device drives the sub-pixel and the light sensor in a sensing frame according to some embodiments of the present disclosure.

FIG. 13 is a timing diagram illustrating that a display device drives the sub-pixel and the light sensor in a sensing frame according to some embodiments of the present disclosure.

The display device according to some embodiments is configured substantially identical to the display device shown in FIG. 10, except an operation of a sensing frame SF. Therefore, identical or similar components are designated by like reference numerals, and overlapping descriptions will be omitted.

Referring to FIGS. 2 and 13, the display panel driver may not write the data voltage VDATA in a sensing frame SF. For example, the display panel driver may perform only the sensing operation without writing the data voltage VDATA in the sensing frame SF.

Figure 14:
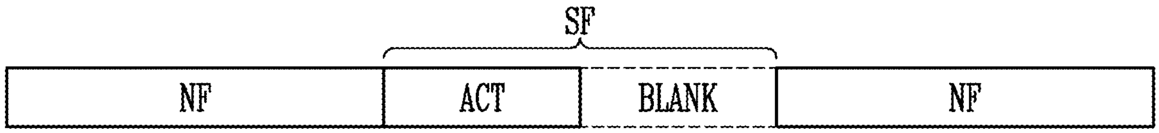
FIG. 14 is a conceptual diagram illustrating a normal frame and a sensing frame according to a display device according to some embodiments of the present disclosure.

FIG. 14 is a conceptual diagram illustrating a normal frame and a sensing frame according to a display device according to some embodiments of the present disclosure.

The display device according to some embodiments is configured substantially identical to the display device shown in FIG. 10, except a length of a sensing frame SF. Therefore, identical or similar components are designated by like reference numerals, and overlapping descriptions will be omitted.

Referring to FIG. 14, a length of a sensing frame SF may be equal to a length of a normal frame NF. The sensing frame SF may include an active period ACT and a blank period BLANK. The display panel driver may scan the sensing area FSA (see FIG. 3) in the active period ACT, and perform the sensing operation. The display panel driver may not scan any pixel lines until a next frame starts after scanning of the sensing area FSA (see FIG. 3) is terminated. That is, the display panel driver may wait for the start of the next frame during the blank period BLANK.

Figure 15:
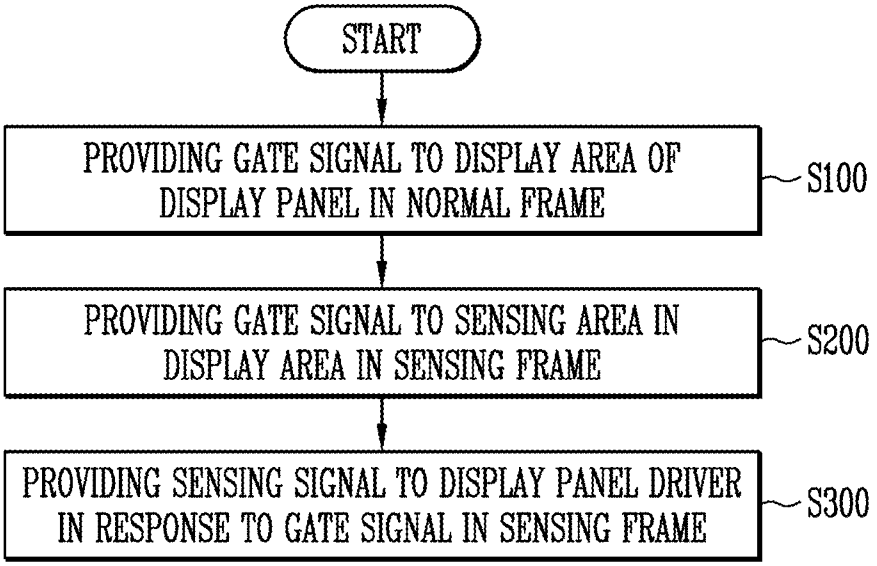
FIG. 15 is a flowchart illustrating aspects of a method of driving a display device according to some embodiments of the present disclosure.

FIG. 15 is a flowchart illustrating aspects of a method of driving a display device according to some embodiments of the present disclosure. Although FIG. 15 illustrates various operations in a method of driving a display device, embodiments according to the present disclosure are not limited thereto, and according to some embodiments, the method may include additional operations, or fewer operations, or the order of operations may vary, unless otherwise stated or implied, without departing from the spirit and scope of embodiments according to the present disclosure.

Referring to FIG. 15, in the method of driving the display device, a gate signal may be provided to a display area of a display panel in a normal frame (S100), a gate signal may be provided to a sensing area in the display area in a sensing frame (S200), and a sensing signal may be provided to a display panel driver in response to the gate signal in the sensing frame (S300). The steps S100 to S300 have been described in detail with reference to FIGS. 1 to 14, and therefore, overlapping descriptions will be omitted.

Figure 16:
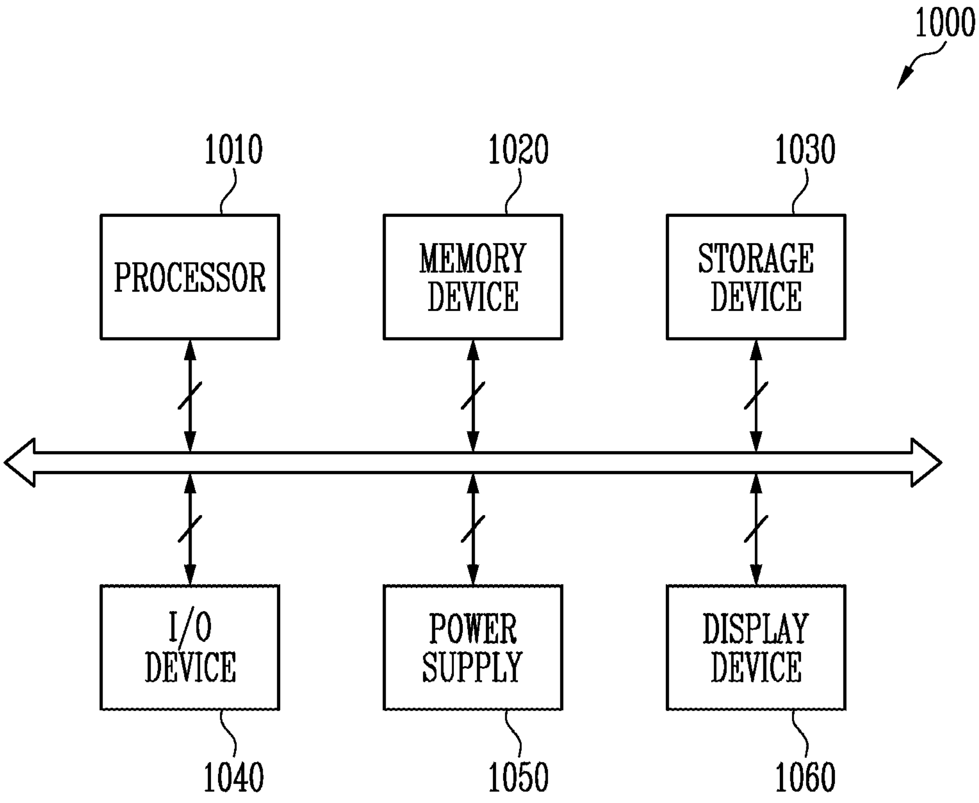
FIG. 16 is a block diagram illustrating an electronic device according to some embodiments of the present disclosure.
Figure 17:
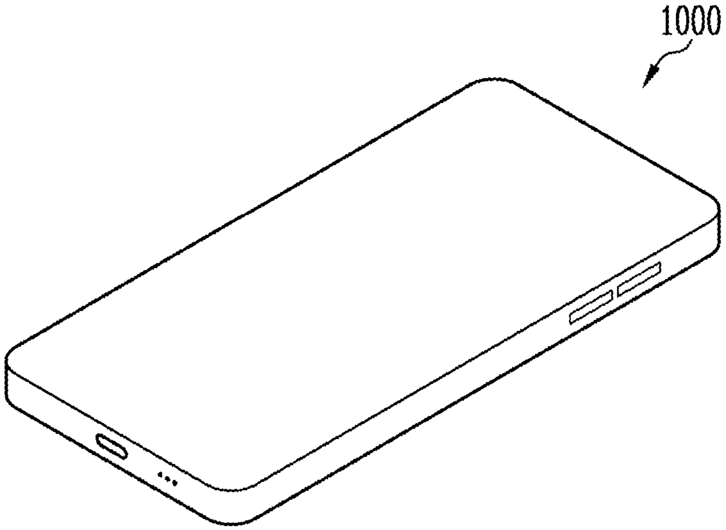
FIG. 17 is a diagram illustrating an example in which the electronic device shown in FIG. 16 is implemented as a smartphone.

FIG. 16 is a block diagram illustrating an electronic device according to some embodiments of the present disclosure. FIG. 17 is a diagram illustrating an example in which the electronic device shown in FIG. 16 is implemented as a smartphone.

Referring to FIGS. 16 and 17, the electronic device 1000 may include a processor 1010, a memory device 1020, a storage device 1030, an input/output (I/O) device 1040, a power supply, 1050, and a display device 1060. The display device 1060 may be the display device shown in FIG. 1. Also, the electronic device 1000 may further include several ports capable of communicating with a video card, a sound card, a memory card, a USB device, and the like, or communicating with other systems. According to some embodiments, as shown in FIG. 17, the electronic device 1000 may be implemented as a smartphone. However, this is merely illustrative, and the electronic device 1000 is not limited thereto. For example, the electronic device 1000 may be implemented as a mobile phone, a video phone, a smart pad, a smart watch, a tablet PC, a vehicle navigation system, a computer monitor, a notebook computer, a head mounted display device, or the like.

The processor 1010 may perform specific calculations or tasks. In some embodiments, the processor 1010 may be a microprocessor, a central processing unit, an application processor, or the like. The processor 1010 may be connected to other components through an address bus, a control bus, a data bus, and the like. In some embodiments, the processor 1010 may be connected to an extension bus such as a peripheral component interconnect (PCI) bus.

The memory device 1020 may store data necessary for an operation of the electronic device 1000. For example, the memory device 1010 may include a nonvolatile memory device such as an Erasable Programmable Read-Only Memory (EPROM) device, an Electrically Erasable Programmable Read-Only Memory (EEPROM) device, a flash memory device, a Phase Change Random Access Memory (PRAM) device, a Resistance Random Access Memory (RRAM) device, a Nano Floating Gate Memory (NFGM) device, a Polymer Random Access Memory (PoRAM) device, a Magnetic Random Access Memory (MRAM) device, or a Ferroelectric Random Access Memory (FRAM) device, and/or a volatile memory device such as a Dynamic Random Access Memory (DRAM) device, a Static Random Access Memory (SRAM) device, or a mobile DRAM device.

The storage device 1030 may include a Solid State Drive (SSD), a Hard Disk Drive (HDD), a CD-ROM, and the like.

The I/O device 1040 may include an input means such as a keyboard, a keypad, a touch screen, or a mouse, and an output means such as a speaker or a printer. In some embodiments, the display device 1060 may be included in the I/O device 1040.

The power supply 1050 may supply power necessary for an operation of the electronic device 1000. For example, the power supply 1050 may be a power management integrated circuit (PMIC).

The display device 1060 may display an image corresponding to visual information of the electronic device 1000. The display device 1060 may be an organic light emitting display device or a quantum dot light emitting display device, but the present disclosure is not limited thereto. The display device 1060 may be connected to other components through the buses or another communication link.

According to some embodiments of the present disclosure, the display device performs sensing of a sensing area in a small number of frames, so that a sensing time can be relatively reduced.

Aspects of some embodiments have been described herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims, and their equivalents.

What is claimed is:

1. A display device comprising:

a display panel including a sub-pixel and a light sensor configured to generate a sensing signal corresponding to an amount of received light and to provide the sensing signal to a display panel driver in response to a gate signal; and the display panel driver configured to drive the display panel, wherein the display panel driver is configured to:

provide the gate signal to a display area of the display panel in a normal frame; and provide the gate signal to pixel lines included in a sensing area in the display area and not provide the gate signal to masked pixel lines outside the sensing area, and to receive the sensing signal in a sensing frame.

2. The display device of claim 1, wherein the sensing frame includes a plurality of sub-frames, and wherein the display panel driver is configured to provide the gate signal to the sensing area in each of the sub-frames.

3. The display device of claim 2, wherein the sensing area is included in pixel lines from a kth pixel line to a wth pixel line, and wherein the display panel driver is configured to provide the gate signal to the pixel lines from the kth pixel line to the wth pixel line in the sensing frame (k is a positive integer, and w is a positive integer greater than k).

4. The display device of claim 2, wherein the sensing area is included in pixel lines from a kth pixel line to a wth pixel line, and wherein the display panel driver is configured to provide the gate signal to pixel lines from a first pixel line to the wth pixel line in the sensing frame (k is a positive integer, and w is a positive integer greater than k).

5. The display device of claim 2, wherein the display panel driver is configured to perform a sensing operation on different pixel lines in each of the sub-frames.

6. The display device of claim 2, wherein the sensing frame includes a first sub-frame and a second sub-frame, and wherein the display panel driver is configured to perform a sensing operation on an nth pixel line in the first sub-frame, and performs a sensing operation on an (n+1)th pixel line in the second sub-frame.

7. The display device of claim 1, wherein a length of a pulse of the gate signal in the sensing frame is longer than a length of a pulse of the gate signal in the normal frame.

8. The display device of claim 1, wherein a length of the sensing frame is equal to a length of the normal frame.

9. The display device of claim 1, wherein a length of the sensing frame is shorter than a length of the normal frame.

10. The display device of claim 1, wherein, based on the sensing area being closer to an opposite end opposite to one end of the display panel than the one end, the display panel driver is configured to scan pixel lines from a pixel line close to the opposite end.

11. An electronic device comprising the display device of claim 1, wherein the electronic device is one of a mobile phone, a video phone, a smart pad, a smart watch, a tablet personal computer, a vehicle navigation system, a computer monitor, a notebook computer, or a head mounted display device.

12. A method of driving a display device including a display panel including a sub-pixel and a light sensor configured to generate a sensing signal corresponding to an amount of received light, the method comprising:

providing a gate signal to a display area of the display panel in a normal frame;

providing the gate signal to pixel lines included in a sensing area in the display area and not provide the gate signal to masked pixel lines outside the sensing area in a sensing frame;

providing the sensing signal to a display panel driver driving the display panel in response to the gate signal in the sensing frame.

13. The method of claim 12, wherein the sensing frame includes a plurality of sub-frames, and wherein the gate signal is provided to the sensing area in each of the sub-frames.

14. The method of claim 13, wherein the sensing area is included in pixel lines from a kth pixel line to a wth pixel line, and wherein the gate signal is provided to the pixel lines from the kth pixel line to the wth pixel line in the sensing frame (k is a positive integer, and w is a positive integer greater than k).

15. The method of claim 13, wherein the sensing area is included in pixel lines from a kth pixel line to a wth pixel line, and wherein the gate signal is provided to pixel lines from a first pixel line to the wth pixel line in the sensing frame (k is a positive integer, and w is a positive integer greater than k).

16. The method of claim 13, wherein a sensing operation on different pixel lines is performed in each of the sub-frames.

17. The method of claim 13, wherein the sensing frame includes a first sub-frame and a second sub-frame, and wherein a sensing operation on an nth pixel line is performed in the first sub-frame, and a sensing operation on an (n+1)th pixel line is performed in the second sub-frame (n is a positive integer).

18. The method of claim 12, wherein a length of a pulse of the gate signal in the sensing frame is longer than a length of a pulse of the gate signal in the normal frame.

19. The method of claim 12, wherein a length of the sensing frame is equal to a length of the normal frame.

20. The method of claim 12, wherein a length of the sensing frame is shorter than a length of the normal frame.

* * * * *